(12) United States Patent
Hodgson et al.

(10) Patent No.: US 10,385,849 B2
(45) Date of Patent: Aug. 20, 2019

(54) METHOD FOR OPERATING A PUMP

(71) Applicant: CONTINENTAL AUTOMOTIVE GMBH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 225 days.

(21) Appl. No.: 15/128,630

(22) PCT Filed: Mar. 20, 2015

(86) PCT No.: PCT/EP2015/055869
§ 371 (c)(1),
(2) Date: Sep. 23, 2016

(87) PCT Pub. No.: WO2015/144570
PCT Pub. Date: Oct. 1, 2015

(65) Prior Publication Data
US 2017/0107984 A1    Apr. 20, 2017

(30) Foreign Application Priority Data

Mar. 26, 2014   (EP) .................................... 14290078

(51) Int. Cl.
*F04C 2/06* (2006.01)
*F04C 5/00* (2006.01)
(Continued)

(52) U.S. Cl.
CPC .............. *F04C 5/00* (2013.01); *F01N 3/2066* (2013.01); *F04B 49/06* (2013.01);
(Continued)

(58) Field of Classification Search
CPC .... F04C 5/00; F04C 15/06; F04C 2/06; F04C 14/28; F04C 2270/19; F04B 49/06;
(Continued)

(56) References Cited

U.S. PATENT DOCUMENTS

| 2,544,628 A | 3/1951 | Copping |
| 3,408,947 A | 11/1968 | McMillan |

(Continued)

FOREIGN PATENT DOCUMENTS

| CN | 101501340 A | 8/2009 |
| CN | 101617124 A | 12/2009 |

(Continued)

*Primary Examiner* — Devon C Kramer
*Assistant Examiner* — David N Brandt
(74) *Attorney, Agent, or Firm* — Laurence A. Greenberg; Werner H. Stemer; Ralph E. Locher

(57) ABSTRACT

A pump includes a pump housing, an inlet, an outlet, a rotatable eccentric, a deformable element between housing and eccentric and a delivery channel from inlet to outlet formed by the deformable element and the housing. The deformable element is pressed against the housing in sections by the eccentric forming a movable seal of the channel and a closed volume in the channel being movable along the channel from inlet to outlet to pump the liquid by rotating the eccentric. A method for operating the pump includes a) setting a liquid quantity to be pumped, b) determining a temperature of the deformable element, c) determining a parameter considering the temperature from step b), the parameter representing a dependence between movement of the eccentric and pump capacity and d) pumping the liquid quantity set in step a) by adapting an operating mode of the pump considering the parameter from step c).

7 Claims, 4 Drawing Sheets

(51) Int. Cl.
*F04C 14/28* (2006.01)
*F04C 15/06* (2006.01)
*F01N 3/20* (2006.01)
*F04B 49/06* (2006.01)

(52) U.S. Cl.
CPC ...... *F01N 2560/06* (2013.01); *F01N 2610/02* (2013.01); *F01N 2610/148* (2013.01); *F01N 2610/1433* (2013.01); *F04B 2201/0403* (2013.01); *F04B 2201/0801* (2013.01); *F04C 2210/1083* (2013.01); *F04C 2220/24* (2013.01); *F04C 2270/19* (2013.01); *Y02A 50/2325* (2018.01); *Y02T 10/24* (2013.01)

(58) Field of Classification Search
CPC ...... F04B 2201/0801; F04B 2201/0403; F01N 3/2066; F01N 2610/1406; F01N 2610/1453; F01N 2610/02; F01N 2560/06; F01N 2610/148; F01N 2610/1433; Y02A 50/2325; H05K 999/99; Y02T 10/24
See application file for complete search history.

(56) References Cited

U.S. PATENT DOCUMENTS

| | | | | |
|---|---|---|---|---|
| 3,696,678 | A | * | 10/1972 | Mossey .................. G01K 13/08 374/104 |
| 5,006,049 | A | * | 4/1991 | von der Heyde ......... F04C 5/00 417/476 |
| 2010/0111687 | A1 | | 5/2010 | Colic |
| 2013/0025268 | A1 | * | 1/2013 | Bauer .................... F01N 3/208 60/317 |
| 2014/0017094 | A1 | | 1/2014 | Ghodsi-Khameneh et al. |
| 2014/0227107 | A1 | * | 8/2014 | Bauer .................... F04B 43/04 417/44.2 |

FOREIGN PATENT DOCUMENTS

| | | |
|---|---|---|
| DE | 2853916 A1 | 6/1980 |
| DE | 3815252 A1 | 11/1989 |
| WO | 2011120839 A1 | 10/2011 |
| WO | 2012126544 A1 | 9/2012 |
| WO | 2013057178 A1 | 4/2013 |

\* cited by examiner

METHOD FOR OPERATING A PUMP

BACKGROUND OF THE INVENTION

Field of the Invention

The invention relates to a method for operating a pump for delivering a liquid. The method can be used, in particular, for operating a pump which serves in a motor vehicle to deliver a liquid additive for exhaust gas purification into the exhaust gas treatment apparatus of the motor vehicle. Exhaust gas treatment apparatuses for purifying the exhaust gases of internal combustion engines, in which a liquid additive for exhaust gas purification is used, are widespread. Liquid additives are required in exhaust gas treatment apparatuses, in particular, to effectively reduce nitrogen oxide compounds in the exhaust gas of the internal combustion engine. The exhaust gas purification process which is carried out here is called an SCR process (SCR=Selective Catalytic Reduction).

Urea/water solution is usually used as a liquid additive for the SCR process. A urea/water solution which is used particularly frequently for the exhaust gas treatment with a urea content of 32.5% is available, for example, under the commercial name AdBlue®. For the SCR process, said urea/water solution is then converted into ammonia externally in a reactor which is provided specifically for this purpose or internally in the exhaust gas within the exhaust gas treatment apparatus. The reaction of nitrogen oxide compounds in the exhaust gas to form non-hazardous substances then takes place with the aid of the ammonia.

It is problematic during the delivery of liquid additive in an exhaust gas treatment apparatus that the liquid additive can freeze at low temperatures. AdBlue® freezes, for example, at temperatures of −11° C. Temperatures of below −11° C. can occur, in particular, in winter during long parked phases of a motor vehicle. An apparatus for delivering and providing urea/water solution of this type to an exhaust gas treatment apparatus has to be designed in such a way that it cannot be impaired by way of freezing liquid additive.

Moreover, the accuracy of the metering of the liquid additive for the exhaust gas treatment apparatus is an important requirement. This is due to the fact that a defined quantity of liquid additive is required in each case for the exhaust gas treatment for a defined present quantity of contaminants in the exhaust gas. Said quantity has to be fed to the exhaust gas treatment apparatus as accurately as possible. Excessive metering of liquid additive can lead, for example, to the escape of liquid additive from the exhaust gas treatment apparatus. Moreover, excessive metering brings about a higher consumption of liquid additive. A higher consumption of liquid additive is frequently disadvantageous, because the liquid additive firstly causes costs and secondly a tank for storing the liquid additive in a motor vehicle has to be refilled more frequently or has to be of greater dimensions. Moreover, there is also the risk of insufficient metering of liquid additive if the delivery and provision of the liquid additive does not take place with a sufficient accuracy. In the case of insufficient metering, it is possible that pollutant constituents in the exhaust gas are not removed and can escape in unpurified form from the exhaust gas treatment apparatus.

BRIEF SUMMARY OF THE INVENTION

Proceeding from this starting position, it is an object of the present invention to solve or at least to mitigate the described technical problems. This is achieved, in particular, by way of a method for operating a pump for delivering a liquid and by way of a pump for delivering a liquid in accordance with the following description. It is to be noted that the exemplary embodiments of the method and the pump which are explained in the following text can be combined with one another in any desired, technologically appropriate way and in the process indicate further exemplary embodiments of the pump.

The invention relates to a method for operating a pump for delivering a liquid, having at least one pump housing with at least one inlet and at least one outlet, an eccentric being arranged on the pump housing, which eccentric can be rotated about an axis relative to the pump housing, a deformable element being arranged between the pump housing and the eccentric, and a delivery channel from the at least one inlet to the at least one outlet being configured by way of the deformable element and the pump housing, and, furthermore, the deformable element being pressed by the eccentric in sections against the pump housing in such a way that at least one displaceable seal of the delivery channel and at least one closed pump volume in the delivery channel are formed, which, in order to deliver the liquid, can be displaced by way of a rotational movement of the eccentric along the delivery channel from the inlet to the outlet, and the method comprising at least the following steps:

a) fixing of a liquid quantity which is to be delivered by way of the pump,
b) determining of a temperature of the deformable element,
c) determining of at least one parameter taking the temperature from step b) into consideration, the parameter reflecting dependence between the movement of the eccentric and the delivery capacity of the pump,
d) delivering the liquid quantity which is fixed in step a), a method of operation of the pump being adapted with consideration of the parameter from step c).

The described pump type is also called an orbital pump. The fundamental construction of said pump type is known, for example, from documents U.S. Pat. Nos. 2,544,628, 3,408,947, DE 285 39 16 A1 and DE 381 52 52 A1.

The pump has a (central) axis, around which the eccentric can be rotated. For this purpose, a drive shaft preferably runs along the drive axis, which drive shaft connects the eccentric to an (electrically operable) drive. The drive is preferably arranged along the axis above and/or below the pump housing. For the spatial description of the pump and its components, a radial direction is assumed in the following text, which radial direction lies perpendicularly on the axis of the pump and, starting from the axis of the pump, extends in the radial direction toward the outside. A circumferential direction is to be defined perpendicularly with respect to the radial direction and tangentially with respect to the axis. The delivery channel runs from the inlet and to the outlet of the pump at least in sections along said circumferential direction through the pump housing or along the circumferential face of the pump housing. A center plane of the pump is also defined for further description of the pump. Said center plane is arranged perpendicularly with respect to the axis. The pump housing, the eccentric, the deformable element and the delivery channel lie in the center plane.

The pump housing of the pump is preferably constructed in the manner of a ring or a cylindrical chamber, in which the eccentric is arranged on the inside. The circumferential face of the pump housing is, in particular, an inner circumferential face. The circumferential face of the pump housing is preferably (at least for the greatest part) of rotationally symmetrical configuration with respect to the axis of the (central) axis of the pump. The pump housing can also be considered to be an (external) stator of the pump, the eccentric being called an (internal) rotor. It is possible in accordance with a further embodiment of the pump that the pump housing forms an internal stator which is surrounded by the eccentric. The eccentric then forms an external rotor. The inlet and the outlet are arranged on the pump housing and make the inflow and the outflow of the liquid into the pump housing or into the delivery channel possible. The pump housing is preferably made from plastic. Reinforcing structures can be integrated into the pump housing. In one preferred design variant, an annular metallic insert is integrated into a pump housing which is made from plastic, which insert stiffens the pump housing.

Here, the term "eccentric" means, in particular, a circular structure which is arranged eccentrically (off-center) with respect to the axis and performs an eccentric movement by way of a rotation around the axis. An annular or circumferential gap, in which the deformable element is arranged, is formed between the pump housing and the eccentric. The delivery channel is arranged (within the gap) between the deformable element and the pump housing and is delimited by the pump housing and the deformable element. The gap has at least one constriction which is shifted along the pump housing or along the delivery path by way of a rotation of the eccentric. The deformable element is pressed against the housing at the constriction, with the result that the displaceable seal is formed there. The term "eccentric" also includes what are known as multiple-piece eccentrics which form a plurality of constrictions of the gap between the pump housing and the eccentric. Multiple-piece eccentrics of this type are particularly preferably configured as roller eccentrics. An eccentric of this type has a plurality of rollers which roll on the deformable element and in each case form the constrictions.

Between the pump housing and the deformable element, the delivery channel has a channel cross section, through which liquid can flow and which can be, for example, (depending on the size of the pump) between 1 mm$^2$ [square millimeter] and 50 mm$^2$ at the largest point.

The delivery channel is configured so as to be annular or circumferential about the axis. The inlet and the outlet are preferably arranged in a delivery direction of the pump at an angular spacing of more than 270° with respect to one another (measured in the center plane). Counter to the delivery direction, the inlet and the outlet are therefore at an angular spacing of less than 90° from one another.

The eccentric is preferably of multiple-piece configuration. The eccentric preferably has an inner region which performs an eccentric rotational movement. In addition, an outer bearing ring can be provided which surrounds the inner region. At least one bearing is preferably situated between the inner region and the outer bearing ring. Said bearing can be a ball bearing or a roller bearing. During operation, the inner eccentric region of the eccentric performs a rotational movement about the axis. The eccentric arrangement and possibly also the external shape of the eccentric result in an eccentric movement of a surface of the eccentric. Said eccentric movement is transmitted to the outer bearing ring. By way of a bearing between the inner region and a bearing ring, an eccentric rotational movement of the inner region can be converted into an eccentric tumbling movement of the bearing ring, without the rotational movement component of the movement of the inner region also being transmitted. The fact that the movement of the bearing ring does not have any rotational movement component makes it possible to reduce shear stresses in the deformable element and inner frictional forces of the pump. The deformable element is flexed by way of the movement of the eccentric. Preferably only compressive forces and substantially no frictional forces act at a contact face of the eccentric and the deformable element. A corresponding division of the eccentric into an inner eccentric region and a bearing ring is also possible if the eccentric is an external rotor which is arranged around an (inner) pump housing. It is also possible that the outer bearing ring is dispensed with and the rollers of the bearing roll directly on the deformable element.

The deformable element is preferably arranged between the eccentric and the pump housing in such a way that the eccentric presses the deformable element in regions against or onto the pump housing in such a way that the at least one displaceable seal is formed in this way. A (linear or full-area) contact between the deformable element and the pump housing exists at the seal, which contact cannot be flowed through by the liquid. In other words, the deformable element bears completely against the pump housing, with the result that the channel cross section in the region of said displaceable seal does not have any cross-sectional area. Accordingly, the delivery channel is interrupted in the region of the displaceable seal. Therefore, at least one closed pump volume is also formed within the delivery channel. A closed pump volume means that a section of the delivery channel exists, which section is closed at least on one side. By way of a displacement of the displaceable seal, the at least one closed pump volume is also displaced, with the result that the liquid which is situated in the closed pump volume is delivered. During the operation of the pump, a plurality of closed pump volumes are preferably displaced from the inlet of the pump to the outlet of the pump, in order to deliver the liquid. Therefore, a closed pump volume is configured in the vicinity of the inlet (closed at least on one side in a defined manner) and is then dispersed at the outlet (opened again at least on one side in a defined manner). A closed pump volume is closed only on one side downstream by way of a displaceable seal at the inlet and is connected upstream to the inlet, with the result that liquid can flow through the inlet into the closed pump volume. At the outlet, the closed pump volume is closed (only) on one side, however, upstream by way of a seal and is connected downstream to the outlet, with the result that the liquid can flow through the outlet out of the closed pump volume. A phase exists in between (on the path of the closed pump volume from the inlet to the outlet), in which phase the closed pump volume is closed upstream and downstream by way of the at least one displaceable seal.

The deformable element can also be called a deformable diaphragm. Here, the term "diaphragm" does not make any mandatory statement as to whether the deformable element has a full-area extent. The term "diaphragm" is to be understood as an indication that the deformable element is a flexible structure which can be deformed in order to deliver liquid. An elastomer material (for example, rubber or latex) is preferably used as material for the deformable element or the deformable diaphragm. In order to increase the durability and/or to produce and maintain the flexibility, the material of the deformable element can contain additional substances. The deformable element is preferably flexible in all directions (in the axial direction, in the radial direction and in the circumferential direction). It is also possible, however, that the deformable element has a partially directional flexibility. For example, it can have a higher flexibility in the radial direction than in the circumferential direction and in the axial direction. A deformation of the deformable element in one direction typically also necessitates a deformation in other directions. The deformable element expands, for example, in the axial direction and/or in the circumferential direction when it is compressed in the radial direction.

A stationary seal is preferably also provided on the pump, which stationary seal prevents an undesired return flow of the liquid from the outlet to the inlet (counter to the delivery direction). The stationary seal can be provided in a stationary manner with the pump housing and can be positioned between the outlet and the inlet. The deformable element can be clamped or adhesively bonded, for example, on the pump housing in the region of the stationary seal, in order to ensure a fluid tight seal between the pump housing and the deformable element in the long term. The stationary seal is fluid tight independently of the position of the eccentric.

A delivery of liquid in the delivery direction from the inlet to the outlet is preferably possible by way of the pump. By way of a reversal of the rotational direction of the eccentric, a reversal of the delivery direction (instead of from the inlet to the outlet, in a reversed manner from the outlet back to the inlet) is optionally also possible.

Step a) defines, for example, the fixing of a metering requirement in a control unit. A control unit determines, for example, a liquid quantity which is to be delivered by way of the pump, as a function of certain operating conditions of an internal combustion engine and/or as a function of certain parameters in an exhaust gas treatment apparatus. The liquid quantity is calculated in step a), for example, from an NOx quantity (quantity of nitrogen oxide compounds) in the exhaust gas.

The determining of the temperature of the deformable element in step b) can take place, for example, directly with the aid of a temperature sensor on the deformable element or in the deformable element. As an alternative or in addition, the temperature can be determined indirectly via an estimation or calculation. To this end, a temperature sensor can be in contact with the deformable element indirectly (for example, via a pump housing of the pump or the eccentric of the pump).

Step c) is usually carried out in a control unit. The parameter which is defined in step c) can be calculated, for example, using a characteristic diagram with consideration of the temperature from step b). The parameter serves to compensate for a change in the delivery capacity or the delivery quantity of the pump as a function of the temperature. For example, the information that a known quantity of liquid additive is usually delivered during a rotational movement of the eccentric by a defined rotary angle (for example, 20 degrees) can be stored in a characteristic diagram. At the same time, it can be stored in the characteristic diagram that said delivery quantity drops at an elevated temperature during an identical rotational movement of the eccentric. Said information is expressed in the parameter which is defined in step c).

In step d), the parameter which is determined in step c) is used to carry out adapted operation of the pump with consideration of the parameter. It is possible in this way to operate the pump with accurate metering even at changing temperatures.

Moreover, the method is advantageous if, before step c), an angular position of the eccentric is determined and said angular position is taken into consideration during the determination of the at least one parameter in step c).

In this context, an angular position of the eccentric means the angular position of a constriction between the pump housing and the eccentric, at which constriction the deformable element is pressed onto the pump housing and the stationary seal is configured. A relationship between the delivery capacity of the pump as a function of the angular position of the eccentric within the pump frequently changes. A stationary seal of the pump is described further above. In the region of said stationary seal, a rotational movement of the eccentric by a defined rotary angle (for example, 20 degrees) brings about a considerably smaller delivery quantity than if the same rotary angle is used when the eccentric is positioned so as to lie opposite the stationary seal. This is due to the fact that the eccentric does not have any substantial influence on the shape and the configuration of the delivery channel and the movable seal in the pump in the region of the stationary seal. The consideration of the angular position of the eccentric in the described method once again improves the delivery and metering accuracy of the pump.

Furthermore, the method is advantageous if the liquid quantity which is fixed in step a) is taken into consideration during the determination of the at least one parameter in step c).

The fixing of the liquid quantity is important, for example, because the angular section, by which the eccentric is moved further in order to deliver the fixed liquid quantity, is different depending on the fixed liquid quantity. It is possible, for example, that the eccentric has to pass the above-described stationary seal once or even multiple times in the case of large liquid quantities. This can influence the relationship between the movement of the eccentric and the delivery quantity. The consideration of this relationship also further increases the delivery accuracy and the metering accuracy of the pump.

Furthermore, the method is advantageous if the temperature of the deformable element in step b) is calculated by way of an energy model.

In the context of an energy model, for example, the overall quantity of thermal energy which is already flowing into the deformable element can be taken into consideration, in order to make a conclusion there from about the temperature of the deformable element. The overall energy quantity which is introduced into the deformable element depends, for example, on the power loss of the pump during the delivery of the liquid additive. Said power loss can be influenced, for example, by way of the rotational speed of the pump, the number of pump revolutions which have already taken place and/or the duration of a pause in the delivery by way of the pump. The power loss is produced, in particular, by way of flexing work and/or deformation work in the deformable element. Power loss is also produced by way of waste heat of the (electric) drive of the pump. The electric drive energy which is consumed by the pump can also be taken into consideration during the calculation of the power loss.

At the same time, an energy outflow of thermal energy from the pump can also be taken into consideration. Said energy outflow takes place firstly via the liquid which is conveyed into the pump and out of the pump. The liquid which flows into the pump is as a rule cooler than the liquid which exits from the pump, which results in an output of energy overall from the pump via the liquid. Moreover, the pump emits thermal energy. At the same time, thermal conduction out of the pump also takes place, which thermal conduction is higher, the higher the temperature of the pump. It is also possible, however, that thermal energy flows from the outside into the pump, for example if the pump, an apparatus in which the pump is contained, or a liquid pump in the vicinity of the pump are heated and heat is transmitted to the pump.

The stated quantities of thermal energy which flow into the pump and the stated energy outflows can be taken into consideration, in order to estimate the temperature of the deformable element. This represents a particularly inexpensive possibility to obtain information about the temperature of the deformable element.

A pump for delivering a liquid is also to be described here, which pump is set up to carry out the described method, having at least one pump housing with at least one inlet and at least one outlet, an eccentric being arranged on the pump housing, which eccentric can be rotated about an axis relative to the pump housing, a deformable element being arranged between the pump housing and the eccentric, and a delivery channel from the at least one inlet to the at least one outlet being configured by way of the deformable element and a cylindrical circumferential face of the pump housing, and, furthermore, the deformable element being pressed by the eccentric in sections against the pump housing in such a way that at least one displaceable seal of the delivery channel and at least one closed pump volume in the delivery channel are formed, which, in order to deliver the liquid, can be displaced by way of a rotational movement of the eccentric along the delivery channel from the inlet to the outlet, the pump having at least one temperature sensor for determining the temperature of the deformable element in step b).

The special features of a pump which are described further above in conjunction with the described method can be applied correspondingly to the described pump.

The temperature sensor for determining the temperature serves, in particular, to carry out step b) of the described method.

The pump is particularly advantageous if the at least one temperature sensor comprises an infrared sensor which detects thermal radiation which emanates from the deformable element.

An infrared sensor of this type can be arranged spaced apart from the deformable element and can nevertheless directly measure the temperature of the deformable element. An infrared sensor is therefore particularly suitable for the described method and the pump. The infrared sensor preferably measures the temperature of the deformable element at a measuring point on the deformable element, the temperature of the measuring point being representative of the overall temperature (mean temperature) of the deformable element. The measuring point can be arranged, for example, at a particularly central location of the deformable element, for example in a channel which extends into the deformable element. In another design variant, the measuring point can be connected to thermal conducting elements which guide the heat of the deformable element to the measuring point. Thermal conducting elements can be, for example, (metallic) inserts in the deformable element.

The pump is particularly advantageous if a radiation channel runs through the pump housing, along which radiation channel the thermal radiation passes from the deformable element to the infrared sensor.

A radiation channel can be configured, for example, by way of a bore in the pump housing, through which the thermal radiation can pass from the deformable element to the infrared sensor. The radiation channel can also extend partially through the deformable element, for example in the form of a channel, at the end of which the measuring point is situated. A radiation channel can also be formed, for example, by way of a gap between the eccentric and the deformable element. A radiation channel can run in a rectilinear manner. It is also possible that the radiation channel has one or more bends, or is diverted once or a plurality of times, at least one diverting means then being provided within the radiation channel, by way of which diverting means thermal radiation can be guided along the radiation channel.

Furthermore, the pump is advantageous if the at least one temperature sensor comprises a thermocouple which is in contact with the deformable element.

The temperature measurement by way of thermocouples is based on the Seebeck effect. A thermocouple can be arranged, for example, on the surface of the deformable element or can extend into the deformable element. A thermocouple preferably has a measuring point, at which two electric conductors made from different metallic materials are connected to one another. Said measuring point is preferably arranged within or directly on the deformable element. Copper and a copper/nickel alloy or iron and a copper/nickel alloy can be used, for example, as two different metallic materials. In addition, a comparative measuring point is as a rule necessary, it being necessary for the temperature of the comparative measuring point to be known, in order that the measurement by way of the thermocouple can take place. The comparative measuring point can be arranged, for example, on a line which is filled with liquid additive, it preferably being possible for the temperature of the liquid additive to be monitored at the comparative measuring point by way of a further temperature sensor.

Furthermore, the pump is advantageous if the at least one temperature sensor comprises a measuring resistor which is aligned within the deformable element.

The temperature measurement by way of a measuring resistor is based on the temperature dependence of the electrical resistance in the case of different conductor materials. Here, platinum measuring resistors can be used, for example, as material for a measuring resistor. Moreover, a measuring resistor can extend over relatively large sections of the deformable element. It is then possible to determine a mean temperature of the deformable element by way of the measuring resistor. The temperature sensor can also comprise a plurality of measuring resistors. Measuring resistors can be integrated into the deformable element. It is possible, in particular, that measuring resistors are cast or injection molded as inserts into the deformable element.

A motor vehicle is also to be described here, having an internal combustion engine, an exhaust gas treatment apparatus for purifying the exhaust gases of the internal combustion engine, and a described pump, the pump being set up to deliver a liquid additive for exhaust gas purification from a tank to an injector, by way of which the liquid additive can be fed to the exhaust gas treatment apparatus.

The temperature information which is obtained in the context of the described method can be used not only for the described method. In addition, it is possible to use said information for an OBD (On Board Diagnosis). The temperature sensor and the described pump, and the temperature which is detected in the context of the described method, can also be used, for example, to ensure an emergency shutdown of the pump. For example, the determined temperature can be compared with a minimum limit temperature and/or a maximum limit temperature.

If the maximum limit temperature is exceeded, there is the risk of overheating of the pump. If the temperature lies below the minimum limit temperature, there is the risk that ice crystals are present within the pump. Both exceeding of the maximum limit temperature and undershooting of the minimum limit temperature can bring about a destruction of the pump.

The invention and the technical environment will be explained in greater detail in the following text using the figure. The figures show particularly preferred exemplary embodiments, to which the invention is not restricted, however. It is to be noted, in particular, that the figures and the proportions which are shown in the figures are merely diagrammatic. In the figures:

DESCRIPTION OF THE INVENTION

Figure 1:
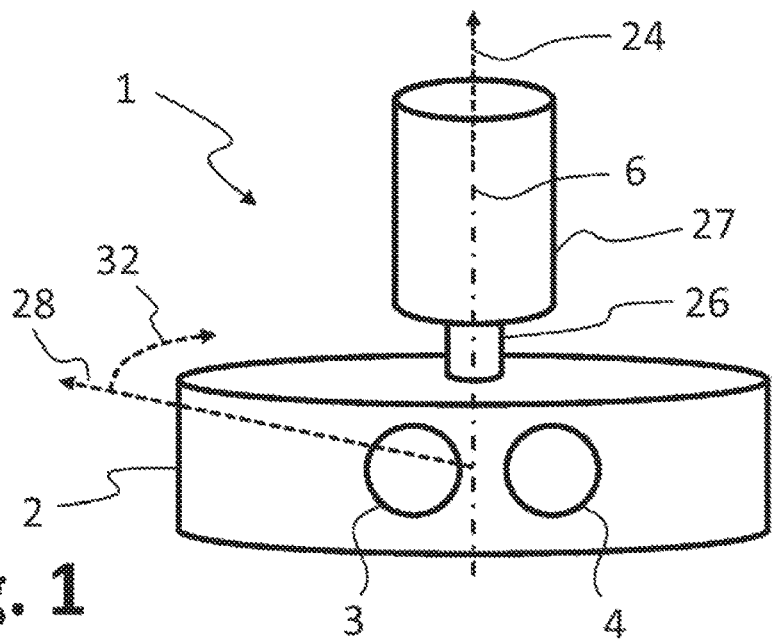
FIG. 1 shows a three-dimensional view of a described pump.

FIG. 1 shows the pump 1 in a three-dimensional view. The pump housing 2 and a coordinate system with an axial direction 24 along the axis 6, a radial direction 28 which lies perpendicularly to the axis 6 and the axial direction 24, and a circumferential direction 32 which is arranged perpendicularly to the radial direction 28 and tangentially with respect to the axis 6 and the axial direction 24 can be seen. Said coordinate system will be used in the following text to describe the spatial arrangement of the components of the pump 1. An inlet 3 and an outlet 4 are situated on the pump housing 2. The eccentric (not shown here) is arranged within the pump housing 2, which eccentric is driven by a drive 27 via a drive shaft 26. The axial direction 24 is oriented along an axis 6, in which both the pump housing 2 with the eccentric (not shown) and the drive 27 are arranged.

Figure 2:
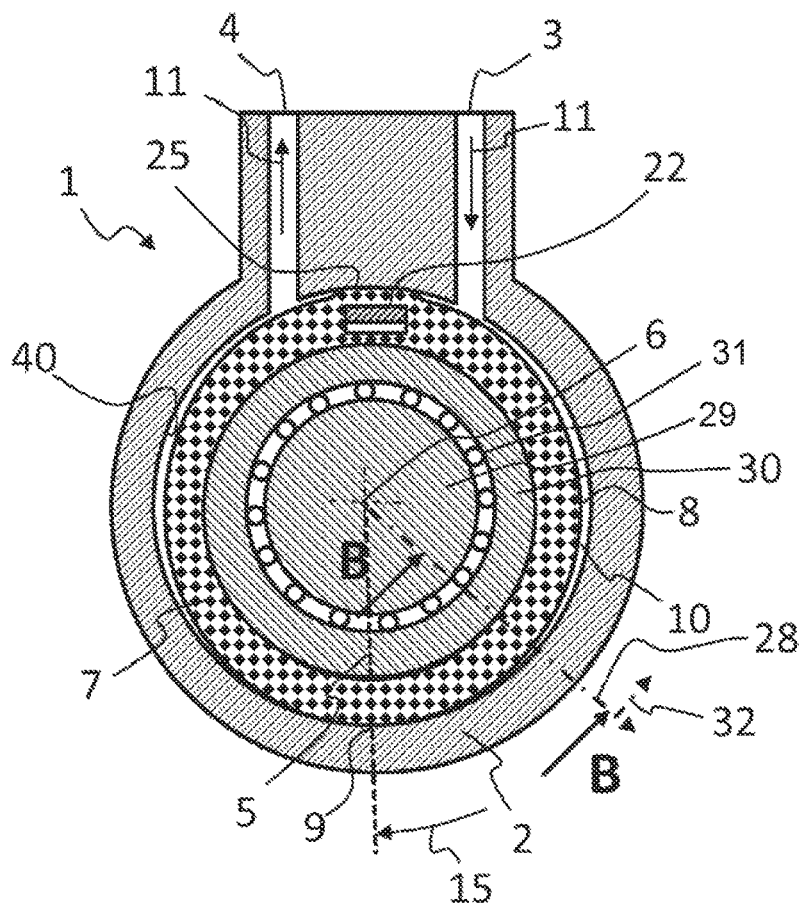
FIG. 2 shows a section through the deformable element of a described pump.

FIG. 2 depicts a section through the pump housing 2 of the pump 1. The inlet 3 and the outlet 4 can likewise be seen in said section. The eccentric 5 is arranged within the pump housing 2. The eccentric 5 is divided into an inner eccentric region 29 and an outer bearing ring 30 which are separated from one another by way of a bearing 31. When the eccentric region 29 carries out an eccentric rotational movement, said rotational movement is converted by the bearing 31 into an eccentric tumbling movement of the bearing ring 30. The deformable element 7 and the delivery channel 8 are situated between the eccentric 5 and the pump housing 2. The deformable element 7 is pressed by the eccentric 5 in sections against the pump housing 2, with the result that a displaceable seal 9 is configured. At least one pump volume 10 is delimited within the delivery channel 8 by way of the displaceable seal 9. The pump volume 10 is likewise displaced by way of a rotation of the eccentric 5 and a displacement of the displaceable seal 9, with the result that the delivery of liquid from the inlet 3 to the outlet 4 with a delivery direction 11 takes place. The radial direction 28 and the circumferential direction 32 can likewise be seen in FIG. 2. Depending on how the eccentric 5 is positioned, the displaceable seal 9 has an angular position 15. Said angular position 15 can be used to increase the accuracy of the delivery of liquid by way of the pump 1 because, depending on where the angular position 15 of the displaceable seal 9 or the eccentric 5 is situated, the delivery quantity of the pump is different during a predefined movement of the eccentric 5 by a defined angular section.

Moreover, the pump 1 has a stationary seal 25 between the outlet 4 and the inlet 3, by way of which stationary seal 25 a return flow of liquid from the outlet 4 to the inlet 3 through the pump is prevented. In the exemplary embodiment which is described here, the stationary seal 25 is realized by virtue of the fact that a pin 22 is inserted into the deformable element 7, which pin 22 presses the deformable element 7 in the region of the stationary seal 25 in a stationary manner against the pump housing 2. By way of the pin 22, the deformable element 7 is clamped onto the pump housing 2. Further variants of stationary seals 25 are conceivable. For example, the deformable element 7 can be adhesively bonded to the pump housing 2 in the region of the stationary seal 25.

Figure 3:
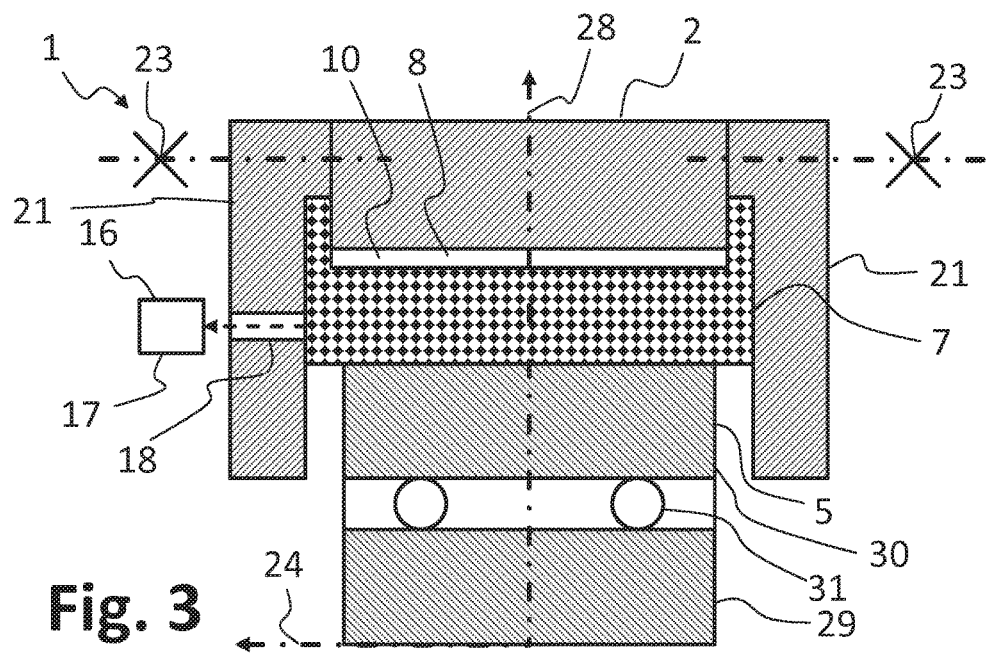
FIG. 3 shows a section through a first design variant of a described pump.
Figure 4:
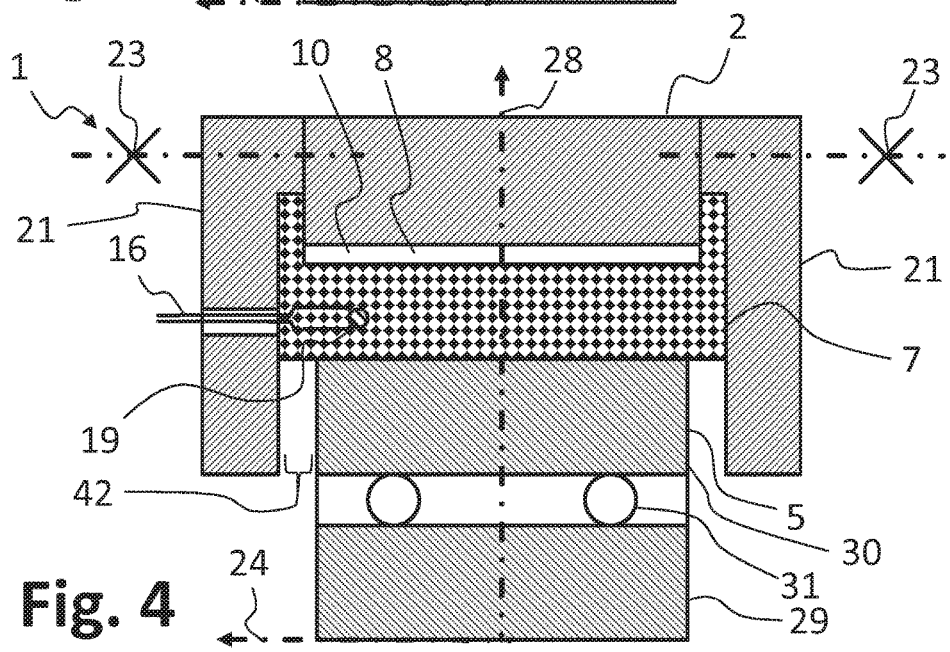
FIG. 4 shows a section through a second design variant of a described pump.
Figure 5:
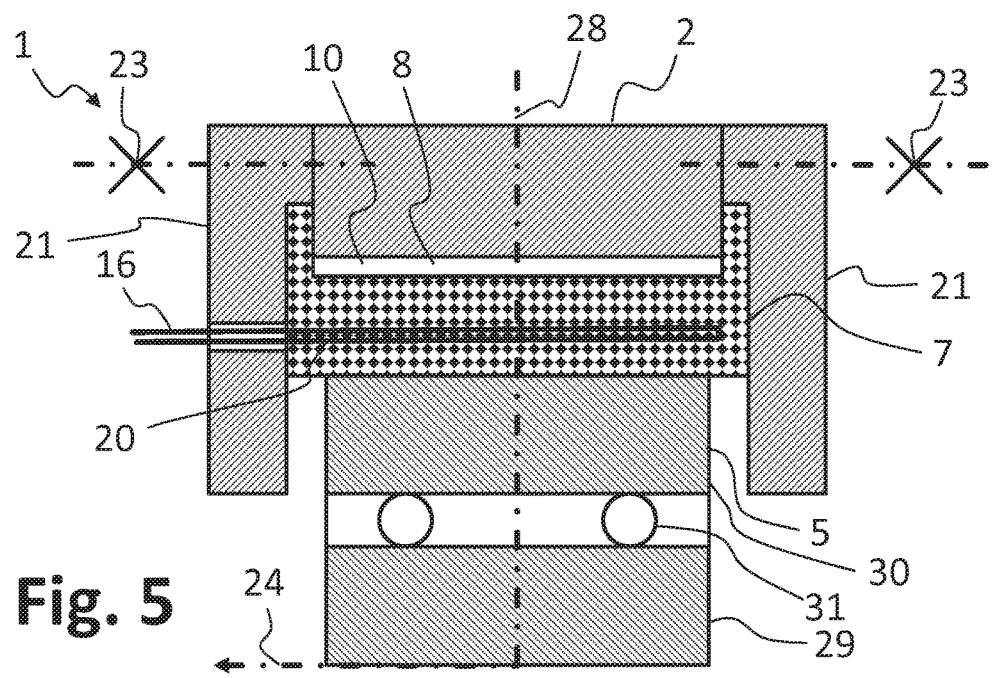
FIG. 5 shows a section through a third design variant of a described pump.

FIGS. 3 to 5 show the cross section from FIG. 2 which is marked using B-B of three different design variants of a described pump 1. In each case, the pump housing 2, the eccentric 5 with the eccentric region 29, the bearing ring 30 and the bearing 31, and the deformable element 7 between the pump housing 2 and the eccentric 5 can be seen. The pump housing 2 has in each case one counter holder 21 on both sides, the two counter holders 21 enclosing and axially sealing the deformable element 7. It is shown by way of example in the figures that the counter holders 21 are fastened to a main component of the pump housing 2 with the aid of bolts 23. At the same time, bracing and sealing of the deformable element 7 on the pump housing 2 can also be realized by way of said bolts 23. The axial direction 24 and the radial direction 28 can also be seen in FIGS. 3, 4 and 5. The delivery channel 8 with a pump volume 10 is situated in each case between the deformable element 7 and the pump housing 2.

In accordance with FIG. 3, a temperature sensor 16 exists which is configured as an infrared sensor 17 and can measure the temperature of the deformable element 7 through a radiation channel 18 which is configured in the pump housing 2. FIG. 4 also shows a gap 42 between the pump housing 2 and the eccentric 5. In a further design variant of the pump 1, the radiation channel 18 can also run through said gap 42. In accordance with FIG. 4, a thermocouple 19 which is in contact with the deformable element 7 exists as temperature sensor 16. FIG. 5 shows a measuring resistor 20 which extends through the deformable element 7 as temperature sensor 16.

Figure 6:
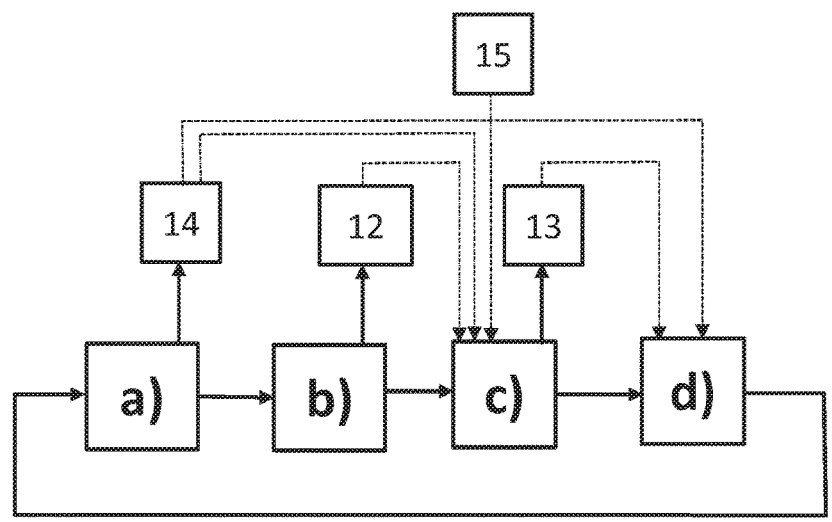
FIG. 6 shows a flow chart of the described method.

FIG. 6 illustrates the sequence of the described method with the method steps a), b), c) and d). In step a), a liquid quantity 14 is determined which is to be delivered by way of the pump. In step b), a temperature 12 of the deformable element is determined. The information about the liquid quantity 14 and the information about the temperature 12 are used in step c), in order to determine the parameter 13. In addition, an angular position 15 of the eccentric can also be used in step c), in order to determine the parameter 13. In step c), a characteristic diagram which is stored in a control unit can be used to this end. In step d), the fixed liquid quantity 14 and the parameter 13 are used to correspondingly describe the delivery unit and to deliver liquid.

Figure 7:
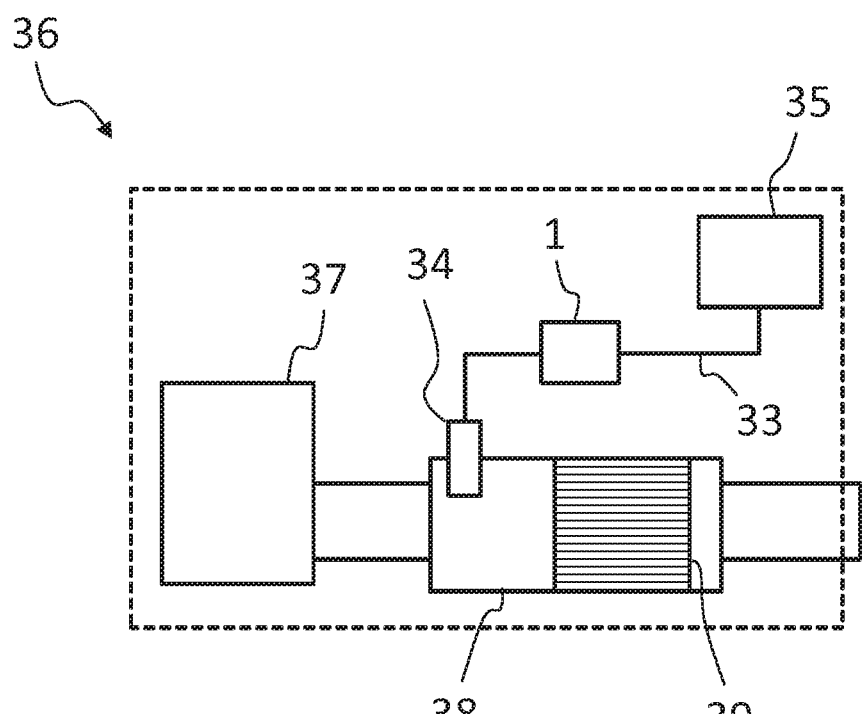
FIG. 7 shows a motor vehicle having a described pump.

FIG. 7 shows a motor vehicle 36 having an internal combustion engine 37 and an exhaust gas treatment apparatus 38 for purifying the exhaust gases of the internal combustion engine 37. An SCR catalytic converter 39 for carrying out the method of selective catalytic reduction is arranged within the exhaust gas treatment apparatus 38. The exhaust gas treatment apparatus 38 can be fed liquid additive with the aid of an injector 34. The injector 34 is supplied with liquid additive from a tank 35 via a line 33. This takes place with the aid of a pump 1.

LIST OF DESIGNATIONS

1 Pump
2 Pump housing
3 Inlet
4 Outlet
5 Eccentric
6 Axis
7 Deformable element
8 Delivery channel
9 Displaceable seal
10 Pump volume
11 Delivery direction
12 Temperature
13 Parameter
14 Liquid quantity
15 Angular position
16 Temperature sensor
17 Infrared sensor
18 Radiation channel
19 Thermocouple
20 Measuring resistor
21 Counterholder
22 Pin
23 Bolt
24 Axial direction
25 Stationary seal
26 Drive shaft
27 Drive
28 Radial direction
29 Eccentric region
30 Bearing ring
31 Bearing
32 Circumferential direction
33 Line
34 Injector
35 Tank
36 Motor vehicle
37 Internal combustion engine
38 Exhaust gas treatment apparatus
39 SCR catalytic converter
40 Circumferential face
41 Gap

The invention claimed is:

1. A method for operating a pump for conveying a liquid, the method comprising the following steps: providing at least one pump housing having at least one inlet and at least one outlet; placing an eccentric at the at least one pump housing, the eccentric being rotatable about an axis relative to the at least one pump housing; placing a deformable element between the at least one pump housing and the eccentric; the deformable element and the at least one pump housing forming a delivery channel from the at least one inlet to the at least one outlet; providing at least one temperature sensor for determining a temperature of said deformable element; providing opposing counter elements mounted on the at least one pump housing and abutting the deformable element, the counter elements sealing the deformable element on the at least one pump housing, one of the counter elements having a channel formed therein for the temperature sensor, the channel opening against the deformable element; the eccentric pressing the deformable element in sections against the at least one pump housing to form at least one displaceable seal of the delivery channel and at least one closed pump volume in the delivery channel; displacing the at least one displaceable seal and the at least one closed pump volume along the delivery channel from the at least one inlet to the at least one outlet by a rotational movement of the eccentric to deliver the liquid; a) setting a liquid quantity to be delivered by the pump; b) determining a temperature of the deformable element with the temperature sensor.

2. A pump for delivering a liquid, the pump comprising:
at least one pump housing having at least one inlet, at least one outlet and a cylindrical circumferential surface;
an eccentric disposed at said at least one pump housing, said eccentric being rotatable about an axis relative to said at least pump housing;
a deformable element disposed between said at least pump housing and said eccentric;
said deformable element and said cylindrical circumferential surface forming a delivery channel from said at least one inlet to said at least one outlet;
said deformable element being pressed by said eccentric in sections against said at least one pump housing to form at least one displaceable seal of said delivery channel and at least one closed pump volume in said delivery channel;
said at least one displaceable seal and said at least one closed pump volume being displaced by a rotational movement of said eccentric along said delivery channel from said at least one inlet to said at least one outlet to deliver the liquid; and
at least one temperature sensor for determining a temperature of said deformable element;
opposing counter elements mounted on said at least one pump housing and abutting said deformable element, said counter elements sealing said deformable element on said at least one pump housing, one of said counter elements having a channel formed therein for said temperature sensor, said channel opening against said deformable element.

3. The pump according to claim 2, wherein said at least one temperature sensor is an infrared sensor for detecting thermal radiation emanating from said deformable element.

4. The pump according to claim 3, wherein said channel is a radiation channel, the thermal radiation passing along said radiation channel from said deformable element to said infrared sensor.

5. The pump according to claim 2, wherein said at least one temperature sensor is a thermocouple being in contact with said deformable element.

6. The pump according to claim 2, wherein said at least one temperature sensor is a measuring resistor.

7. A motor vehicle, comprising:
an internal combustion engine;
an exhaust gas treatment apparatus for purifying exhaust gases of said internal combustion engine; and
a tank for storing a liquid additive for exhaust gas purification;
an injector for feeding the liquid additive to said exhaust gas treatment apparatus; and
a pump according to claim 2 for delivering the liquid additive from said tank to said injector.

* * * * *